(12) United States Patent
Harwood et al.

(10) Patent No.: US 10,409,920 B1
(45) Date of Patent: Sep. 10, 2019

(54) DATA SERVICES FOR TIERED MEMORY

(71) Applicant: EMC Corporation, Hopkinton, MA (US)

(72) Inventors: John S. Harwood, Paxton, MA (US); Alexandr Veprinsky, Brookline, MA (US); Wai C. Yim, Merrimack, NH (US); Erez Webman, Petach Tikva (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 258 days.

(21) Appl. No.: 14/502,531

(22) Filed: Sep. 30, 2014

Related U.S. Application Data (60) Provisional application No. 62/002,497, filed on May 23, 2014.

(51) Int. Cl.
*G06F 7/00* (2006.01)
*G06F 17/30* (2006.01)

(52) U.S. Cl.
CPC .. *G06F 17/30091* (2013.01); *G06F 17/30943* (2013.01)

(58) Field of Classification Search
CPC ......... G06F 17/30598; G06F 17/30607; G06F 17/30312; G06F 17/30318
See application file for complete search history.

(56) References Cited

U.S. PATENT DOCUMENTS

| | | | | |
|---|---|---|---|---|
| 5,339,417 A | * | 8/1994 | Connell | G06F 9/45558 712/244 |
| 5,719,900 A | * | 2/1998 | Dixon | H04B 1/707 375/150 |
| 5,787,309 A | * | 7/1998 | Greenstein | G06F 12/1466 710/36 |
| 8,045,537 B2 | * | 10/2011 | Picard | G01D 4/004 370/350 |
| 8,046,537 B2 | * | 10/2011 | Carr | G06F 3/0605 711/114 |
| 8,732,403 B1 | * | 5/2014 | Nayak | G06F 3/0641 711/135 |
| 9,053,167 B1 | * | 6/2015 | Swift | G06F 17/30575 |
| 9,280,591 B1 | * | 3/2016 | Kharatishvili | G06F 17/30575 |
| 2007/0179995 A1 | * | 8/2007 | Prahlad | G06F 11/1435 |
| 2008/0168228 A1 | * | 7/2008 | Carr | G06F 3/0605 711/117 |
| 2008/0268228 A1 | * | 10/2008 | Dumond | B32B 27/08 428/322.2 |
| 2011/0208938 A1 | * | 8/2011 | Carr | G06F 3/0605 711/165 |
| 2012/0330954 A1 | * | 12/2012 | Sivasubramanian | G06F 9/5061 707/737 |

(Continued)

*Primary Examiner* — Daniel Kuddus
(74) *Attorney, Agent, or Firm* — Krishnendu Gupta; Konrad R. Lee (57) ABSTRACT

A Computer-executable method, system, and computer program product for managing tiers of data storage in a data storage environment using a data storage system, the Computer-executable method, system, and computer program product comprising a non-transitory computer readable medium encoded with computer-executable program code for using read signatures in replication, the code configured to enable the execution of initializing a data stack, updating a map of the data stack; and distributing the map of the data stack to a compute node.

15 Claims, 11 Drawing Sheets

(56) References Cited

U.S. PATENT DOCUMENTS

| | | | | |
|---|---|---|---|---|
| 2013/0282994 | A1* | 10/2013 | Wires | G06F 3/0604 |
| | | | | 711/158 |
| 2013/0290642 | A1* | 10/2013 | Huang | G06F 3/0617 |
| | | | | 711/141 |
| 2014/0108759 | A1* | 4/2014 | Iwamitsu | G06F 3/0604 |
| | | | | 711/165 |
| 2015/0100574 | A1* | 4/2015 | Presta | G06F 17/30584 |
| | | | | 707/737 |
| 2015/0199270 | A1* | 7/2015 | Day-Richter | G06F 12/0253 |
| | | | | 707/816 |
| 2015/0199370 | A1* | 7/2015 | Zheng | H04L 67/2861 |
| | | | | 707/617 |
| 2015/0358391 | A1* | 12/2015 | Moon | H04L 67/10 |
| | | | | 709/224 |

\* cited by examiner

DATA SERVICES FOR TIERED MEMORY

RELATED APPLICATION

This Application claims priority from Provisional Application Ser. No. 62/002,497 filed on May 23, 2014 entitled "DATA SERVICES FOR TIERED MEMORY," the content and teachings of which are hereby incorporated by reference in their entirety.

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to data storage.

BACKGROUND

Computer systems are constantly improving in terms of speed, reliability, and processing capability. As is known in the art, computer systems which process and store large amounts of data typically include a one or more processors in communication with a shared data storage system in which the data is stored. The data storage system may include one or more storage devices, usually of a fairly robust nature and useful for storage spanning various temporal requirements, e.g., disk drives. The one or more processors perform their respective operations using the storage system. Mass storage systems (MSS) typically include an array of a plurality of disks with on-board intelligent and communications electronics and software for making the data on the disks available.

Companies that sell data storage systems and the like are very concerned with providing customers with an efficient data storage solution that minimizes cost while meeting customer data storage needs. It would be beneficial for such companies to have a way for reducing the complexity of implementing data storage.

SUMMARY

A Computer-executable method, system, and computer program product for managing tiers of data storage in a data storage environment using a data storage system, the Computer-executable method, system, and computer program product comprising a non-transitory computer readable medium encoded with computer-executable program code for using read signatures in replication, the code configured to enable the execution of initializing a data stack, updating a map of the data stack; and distributing the map of the data stack to a compute node.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

Like reference symbols in the various drawings indicate like elements.

DETAILED DESCRIPTION

Traditionally, data services have been controlled by the array as it provides the durability for the data and with everything resident can administer replication, snapshots and other advanced services as a custodian of the centralized data. Generally, as persistent data storage, such as flash, is deployed in all layers of the stack from application to storage there is no single durability point or a centralized custodian for the data that can administer services. Conventionally, while advanced data services are desired, finding a single consistent point to manage this has now been disconnected in the new disaggregated stack.

In many embodiments, the current disclosure may enable control of one or more tiers of data storage within a data storage environment. In various embodiments, the current disclosure may enable a data storage system within a data storage environment to provide one or more data storage services which can include, but is not limited to, snapshots, replication, compression, deduplication and data placement. In most embodiments, a data storage environment may include one or more data storage systems that may be enabled to combine resources and/or services.

In many embodiments, a data storage environment may be comprised of combined compute tiering, memory tiering and storage tiering. In various embodiments, the ability to create multiple, independent tiers may be desired. In certain embodiments, a memory tier may be constructed by memory mapping a region of a storage class memory (SCM) device. In other embodiments, a memory tier may be constructed by mapping a region of an array storage device into a process's virtual address space. In some embodiments, SCM may include NAND flash and may include next generation Non-Volatile Memory (NVM) devices.

In most embodiments, memory mapped regions may be fronted by a DRAM page cache which may be used by an application to issue loads and stores. In many embodiments, a memory tiering mechanism may be enabled to move data between a SCM or array device and the DRAM page cache on an on-demand page basis. In various embodiments, the current disclosure may enable data services to be provided on an SCM providing availability, reliability, and durability to the SCM, which may otherwise be a point of failure when installed in a single host. In certain embodiments, by connecting services to a SCM, data may be transparently replicated to tiers on other hosts which may be used for failover and accelerated application restart. In some embodiments, services may be tied to standard mechanisms utilized by an application to synchronize data to the SCM, which may allow for data to persist at any layer in the stack and take advantage of the storage services currently provided much lower in the stack. In most embodiments, the connection of the services across the memory tiers may allow for the storage array to be a logical entity constructed vertically in a stack, encompassing data that persists in the application space.

In many embodiments, applications may have a set of requirements to meet their consumer demands. In various embodiments, to meet desired requirements, the infrastructure may implement a quality of service (QoS) which may have been implemented in a single point in serving storage points. In certain embodiments, QoS implemented in a single host may be utilized by many layers in the stack. In other embodiments, data may be placed in layers that may enable the delivery of the QoS and/or performance required. In some embodiments, in order to meet advanced service requirements, services currently hosted in an array may be mapped to the logical array composed of components vertically in the stack.

In most embodiments, data may be placed in the stack to meet performance demands. In various embodiments, a logical array may understand and control the mapping of the application elements. In certain embodiments, services may be decomposed to a distributed operation which may allow for current methods to be a service supporting clients at the many levels in the vertical stack, hosting data persistence under array based mapping control. In some embodiments, the client/server across the persistence layers, flash, may allow for the single centralized control point to be delivered while maintaining application consistency of distributed data. In most embodiments, a centralized service may understand the mapping of data across all the layers of a SCM and the connection to the clients in the layers may deliver the service for the application for the vertically distributed data. In various embodiments, the current array based service may be enabled to expand vertically to compute, network, and storage elements to maintain the same advanced data services currently delivered in the enterprise space.

Figure 1:
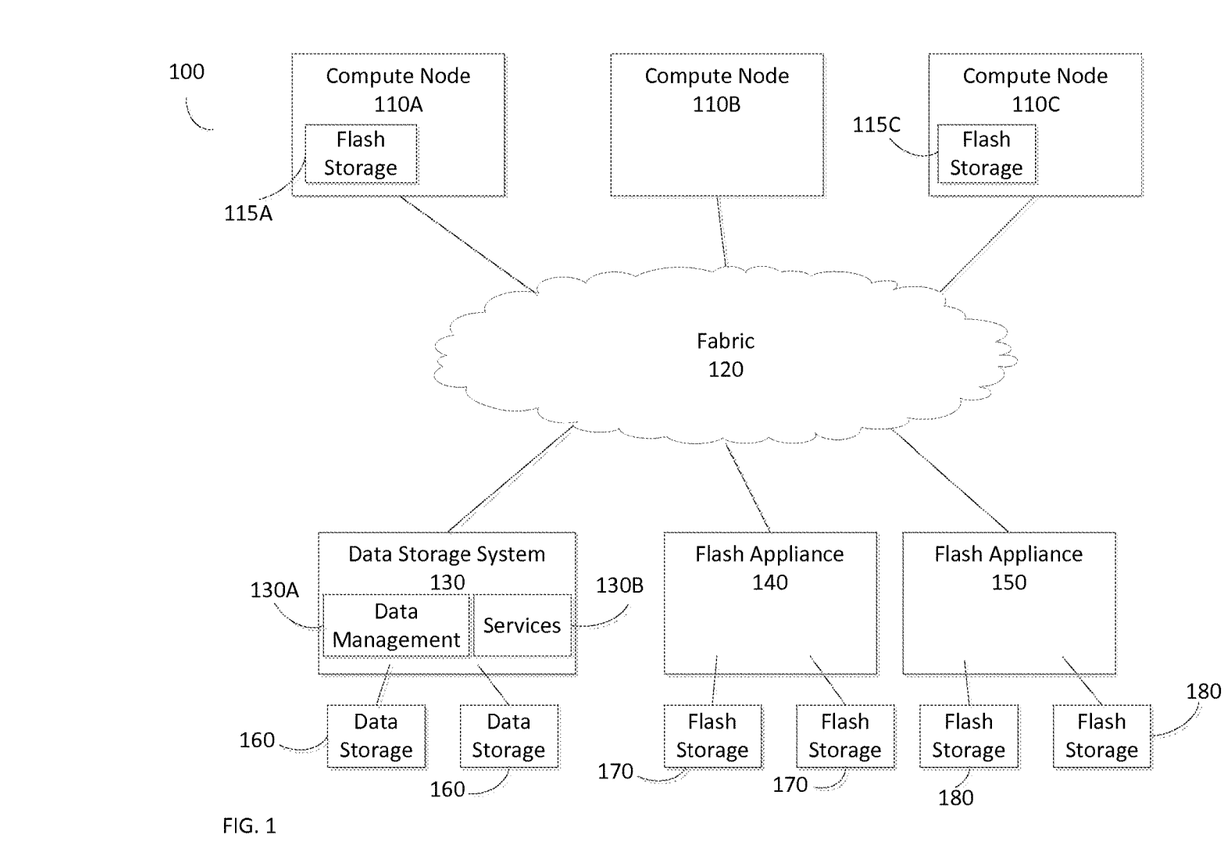
FIG. 1 is a simplified illustration of a data storage environment including multiple data storage systems, in accordance with an embodiment of the present disclosure.

Refer to the example embodiment of FIG. 1. FIG. 1 is a simplified illustration of a data storage environment including multiple data storage systems, in accordance with an embodiment of the present disclosure. Data storage environment 100 includes Compute Nodes (110A-C, 110 Generally), Data storage array 130, Flash Appliance 130, flash appliance 150, and are connected using fabric 120. Fabric 120 enables each node and/or data storage system within data storage environment 100 to communicate with each node and/or data storage system within data storage environment 100. Computer node 110A includes flash storage 115A and compute node 110C includes flash storage 115C. Data storage array 130 includes data management module 130A, services module 130B, and data storage 160. Flash appliance 140 includes flash storage 170 and Flash appliance 150 includes flash storage 180. In many embodiments, a data storage system may be enabled to combine multiple sources of data storage to create a data storage stack.

Figure 2:
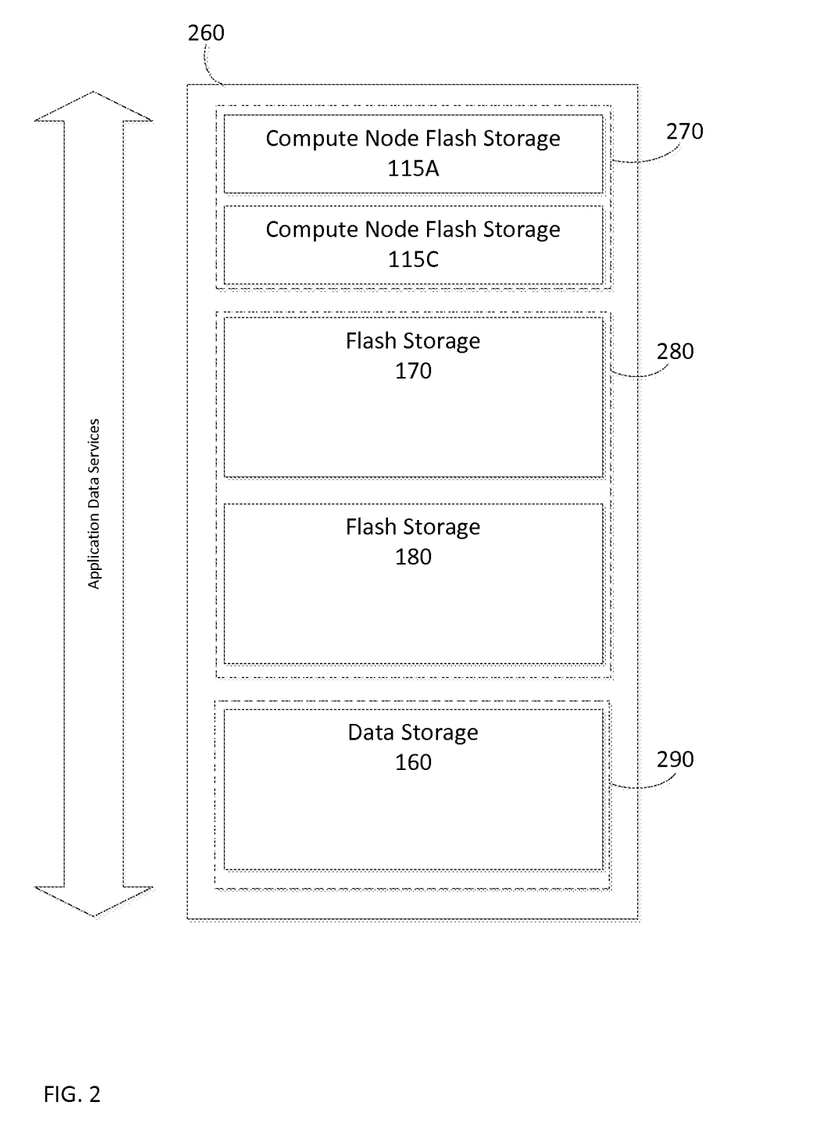
FIG. 2 is a simplified illustration of an implementation of a data storage stack within a data storage environment, in accordance with an embodiment of the present disclosure.

Refer to the example embodiment of FIG. 2. FIG. 2 is a simplified illustration of an implementation of a data storage stack within a data storage environment, in accordance with an embodiment of the present disclosure. Data storage stack 260 is a logical representation of persistent data storage within data storage environment 100 (FIG. 1) which includes multiple compute nodes and/or data storage systems. In this embodiment, data storage stack 260 orders data storage in data storage environment 100 (FIG. 1) as Compute node storage 270, hot storage 280, and cold storage 290. Compute node storage 270 includes compute node flash storage 115A and computer node flash storage 115C. Hot storage 280 includes flash storage 170 and flash storage 180. Cold storage 290 includes data storage 160. Data storage stack 260 enables data management module 130A (FIG. 1) within data storage system 130 (FIG. 1) to provide Applications with data services.

Figure 3:
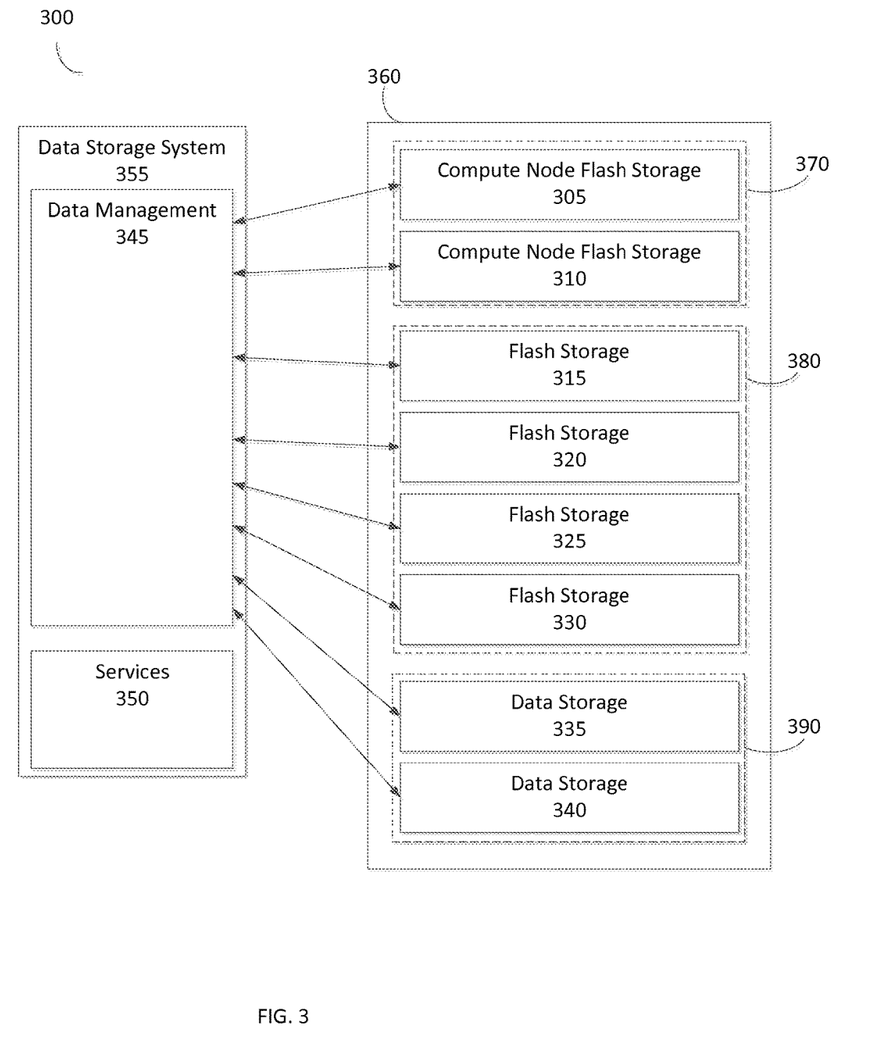
FIG. 3 is a simplified illustration of a data storage stack being managed by a data storage system within a data storage environment, in accordance with an embodiment of the present disclosure.

Refer to the example embodiment of FIG. 3. FIG. 3 is a simplified illustration of a data storage stack being managed by a data storage system within a data storage environment, in accordance with an embodiment of the present disclosure. Data storage environment 300 includes data storage system 355 and data stack 360. Data stack 360 is a logical representation of data storage from one or more data storage systems and/or compute nodes within data storage environment 300. Data storage stack 360 includes compute node storage 370, hot storage 380, and cold storage 390. Compute node storage 370 includes compute node flash storage 305 and compute node flash storage 310. Hot storage 380 includes flash storage 315, 320, 325, 330. Cold storage 390 includes data storage 335, 340.

Data storage system 355 includes data management module 345 and services module 350. Data storage system 355 is enabled to provide data services using data storage stack 360 using data management module 345 and services module 350. As shown, data management module 345 is in communication with compute node flash storage 305, 310, flash storage 315, 320, 325, 330, and data storage 335, 340. In many embodiments, one or more portions of a data storage stack may be contained within data storage system. In various embodiments, a data storage system may be enabled to configure a data storage stack using received information from one or more compute nodes within a data storage environment.

Figure 4:
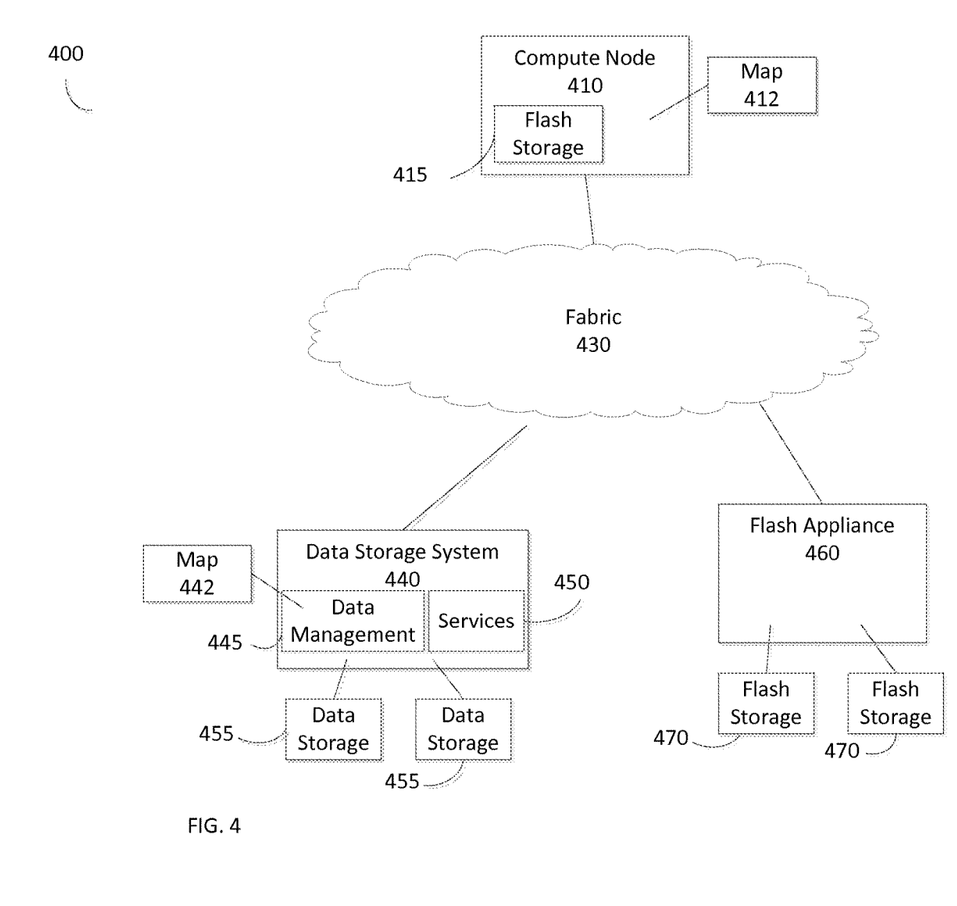
FIG. 4 is a simplified illustration of a data storage system managing a data stack within a data storage environment, in accordance with an embodiment of the present disclosure.

Refer to the example embodiment of FIG. 4. FIG. 4 is a simplified illustration of a data storage system managing a data stack within a data storage environment, in accordance with an embodiment of the present disclosure. As shown, data storage environment 400 includes compute node 410, data storage system 440, and flash appliance 460. Compute node 410, data storage system 440, and flash appliance 460 are enabled to communicate using fabric 430. Compute node 410 includes flash storage 415 and map 412. Data storage system 440 includes data management module 445, services 450, and manages data storage 455. Data management module 445 creates and is enabled to distribute map 442 to any node and/or system that is enabled to utilize data storage from a data storage managed and/or created by data storage system 440. Flash appliance 460 includes flash storage 470. Map 412 is equivalent to Map 442 and Map 412 enables compute node 410 to access data storage within the data stack created by data storage system 440. In this embodiment, data management module 445 is enabled to create a data stack from data storage within data storage environment 400. Data management module 445 is enabled to create and distribute mapping 442 to compute node 410 and flash appliance 460 to enable access to data stored within a data stack to any device having access to mapping 442. Compute node 410 is enabled to use mapping 442 to locate application data within a data storage stack managed by data management module 445.

Figure 5:
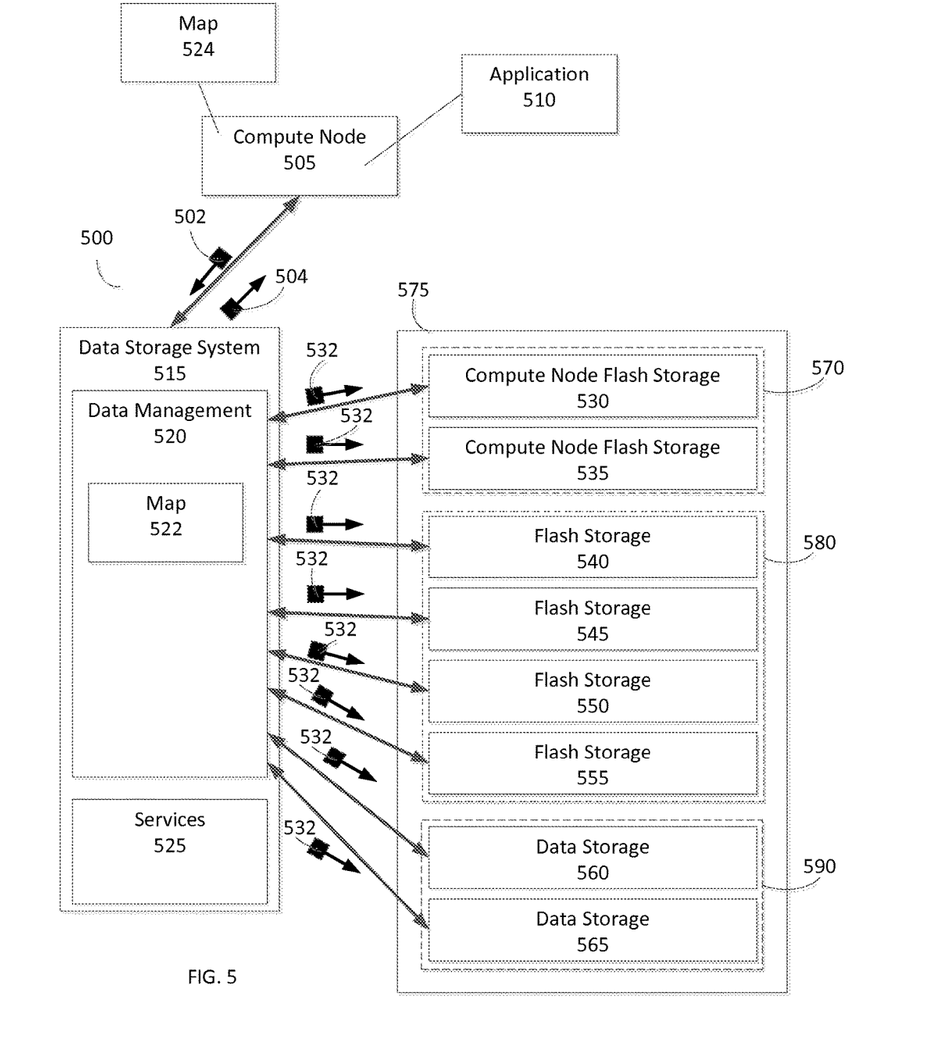
FIG. 5 is a simplified illustration of a data storage system initializing a data stack within a data storage environment, in accordance with an embodiment of the present disclosure.

Refer to the example embodiment of FIG. 5. FIG. 5 is a simplified illustration of a data storage system initializing a data stack within a data storage environment, in accordance with an embodiment of the present disclosure. As shown, data storage environment 500 includes data storage system 515, compute node 505, and a plurality of persistent data storage logically represented by data storage stack 575. Compute node 505 is enabled to host application 510. Data storage system 515 includes data management module 520 and services module 525. Data storage stack 575 includes compute node storage 570, hot storage 580, and cold storage 580. Compute node storage 570 includes compute node flash storage 530 and compute node flash storage 535. Hot storage 580 includes flash storage 540, 545, 550, 555. Cold storage 590 includes data storage 560 and data storage 565. In this embodiment, data storage 560 and data storage 565 are within data storage system 515 and directly managed by data storage system 515.

Data storage system 515 is enabled to configure data storage stack 575 from persistent data storage throughout data storage environment 500. Data storage system 515 is enabled to receive configuration information in message 502 pertaining to persistent data storage within data storage environment 500. Data storage system 515 is enabled to initialize persistent data storage in data storage environment 500 using messages 532. In some embodiments, a data storage system may consume persistent data storage and provide the consumed data storage within a data storage stack which may be available to one or more compute nodes in the data storage environment. In various embodiments, data storage from a data storage stack may be enabled to be provided to one or more compute nodes with one or more data services and/or one or more levels of Quality of Service.

Data storage system 515 is enabled to classify persistent data storage within data storage environment 500 into one of multiple data storage classifications. In this embodiment, data storage system 515 is enabled to classify persistent data storage into compute node storage 570, hot storage 580, and cold storage 590. In many embodiments, data management may be enables to move data between one or more tiers of a data storage stack. For example, in some embodiments, a data management module may be enabled to move lesser used data from compute node storage to cold storage. In certain embodiments, a data management module may be enabled to provide data redundancy using two or more tiers of a data storage stack. Data management module 520 is enabled to create map 522 which is a mapping of persistent storage to data stack 575, which is the logical representation of the persistent storage. Data storage system 515 is enabled to distribute map 522 to compute node 505 using message 504. Map 524 is equivalent to map 522 and enables compute node 505 to access data storage within data storage stack 575 directly.

Figure 6:
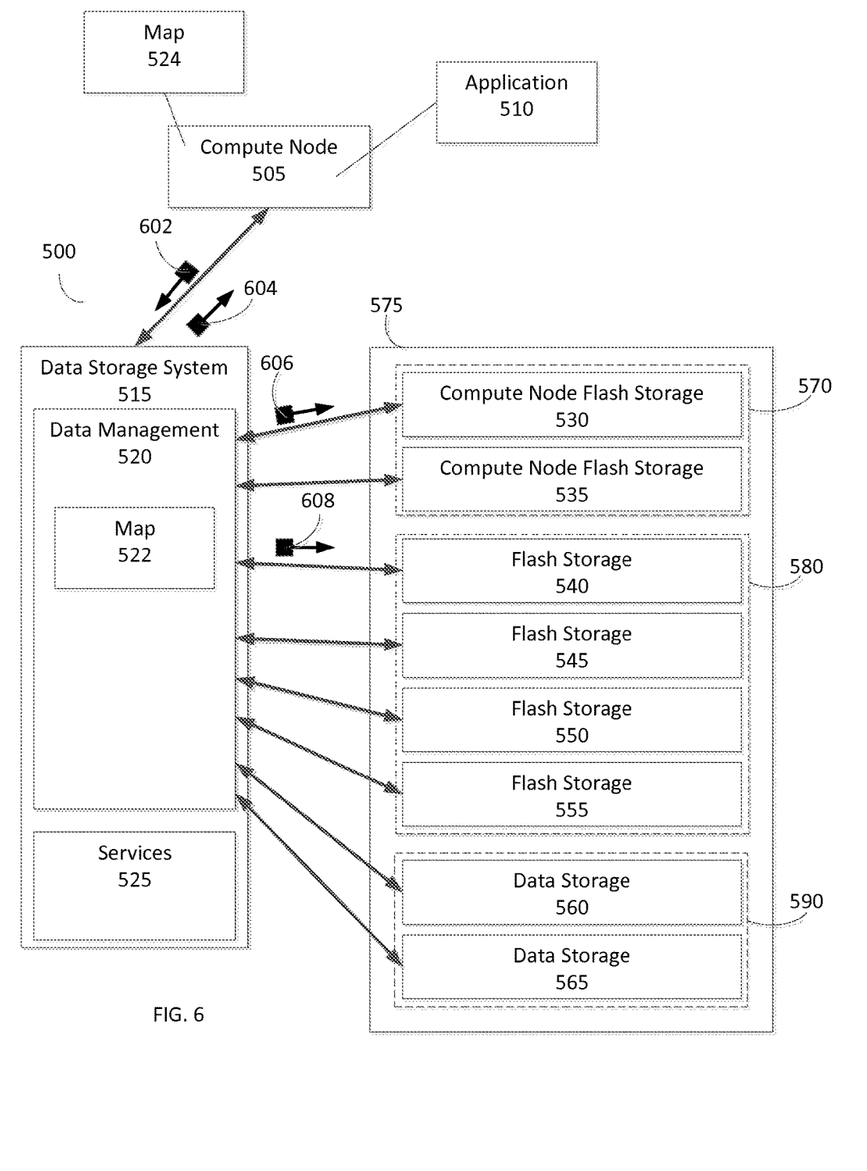
FIG. 6 is a simplified illustration of a compute node requested data services from a data storage system, in accordance with an embodiment of the present disclosure.

Refer to the example embodiment of FIG. 6. FIG. 6 is a simplified illustration of a compute node requested data services from a data storage system, in accordance with an embodiment of the present disclosure. Compute node 505 is in communication with data storage system 515 and is enabled to request data storage services for application 510 using message 602. Data management module 520 is enabled to use information within message 602 to request data services and/or data storage enabled to be provided using services module 525 and data storage stack 575. Data management module 520 is enabled to communicate with data storage stack 575 using message 606 and message 608 to initialize one or more portions of data storage stack 575 to provide data storage and one or more data services for application 505 hosted on compute node 505. Upon determination that data storage and data services are available, data storage system 515 is enabled to update compute node 505 as to the availability of data storage and data services using message 604. In many embodiments, a data management module may be enabled to create and/or update a mapping of application data to data storage within a data storage stack. In various embodiments, a data management module may be enabled to provide a mapping of application data to data storage within a data storage stack to each compute node and/or persistent data storage device in a data storage environment which may enable direct communication with the data storage stack. In some embodiments, a compute node may communicate with a data storage system to gain access to a data storage stack. In most embodiments, a compute node may use a mapping of application data to the data stack to enable access to application data.

Figure 7:
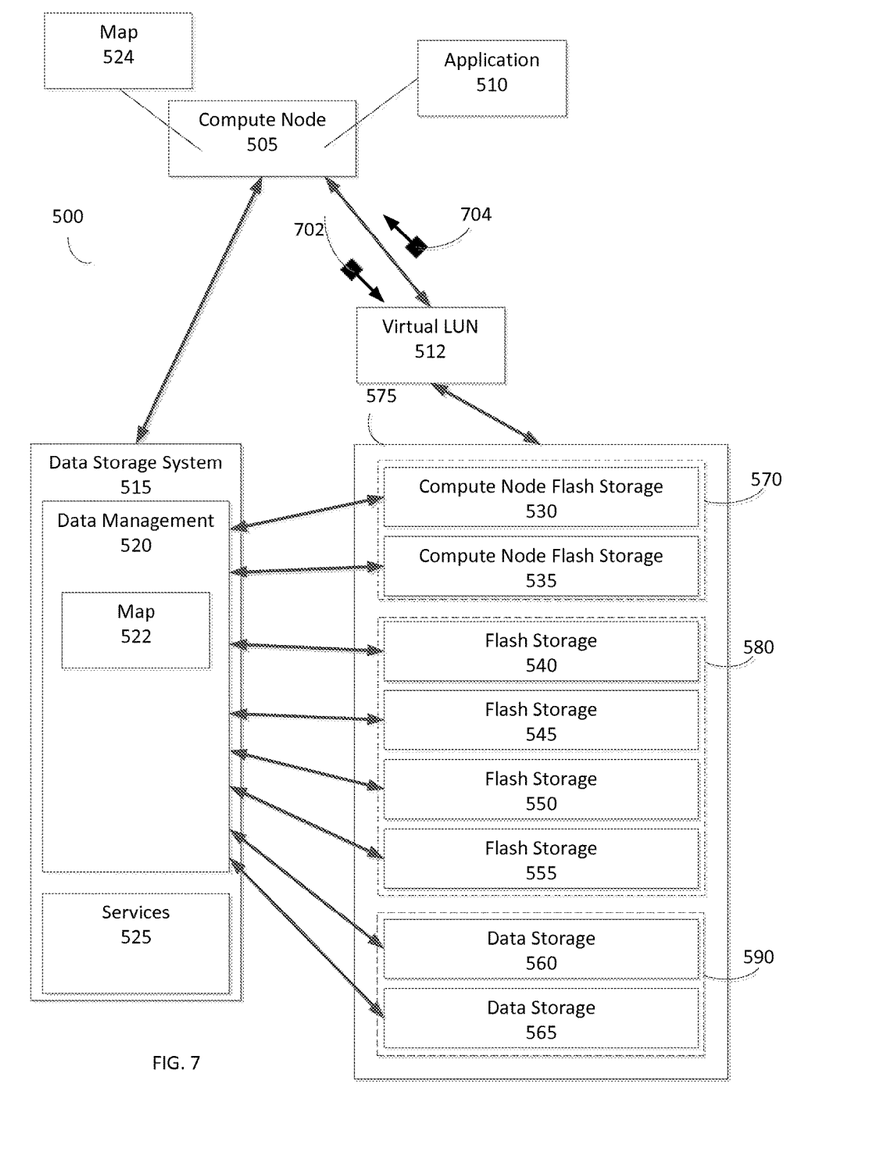
FIG. 7 is a simplified illustration of a compute node using data storage from a data storage stack in a data storage environment, in accordance with an embodiment of the present disclosure.

Refer to the example embodiment of FIG. 7. FIG. 7 is a simplified illustration of a compute node using data storage from a data storage stack in a data storage environment, in accordance with an embodiment of the present disclosure. Data storage environment 500 includes data storage system 515, Compute Node 505, and data storage stack 575. Data management module 520 includes map 522. Data management module 520 creates and/or updates map 522 to show the relationship between application data, available data storage, and data storage stack 575. In many embodiments, the map may include where in the data storage stack application may be stored. In various embodiments, the map may include which data services and/or what Quality of Service may be used by each application. Data management module 520 is enabled to send map 522 to compute node 505 to create mapping 524. Map 522 enables compute node 505 to directly access one or more portions of data storage within data storage stack 575. In this embodiments, compute node 505 requested data storage from data storage system 515. Data storage system 515 is enabled to provide virtual LUN 512 which is enabled to include one or more portions of data storage stack 575.

Using map 524, compute node 505 sends I/O requests to virtual LUN 512 as if virtual LUN 512 existed as a single entity. Virtual LUN 512 is a representation of one or more portions of data storage stack 575 on which data storage system 515 is enabled to provide data services and/or a Quality of Service. In many embodiments, a virtual LUN may include a portion of compute node storage, hot storage, and cold storage. In some embodiments, a virtual LUN may include solely one of the one or more different tiers of data storage within a data stack.

Figure 8:
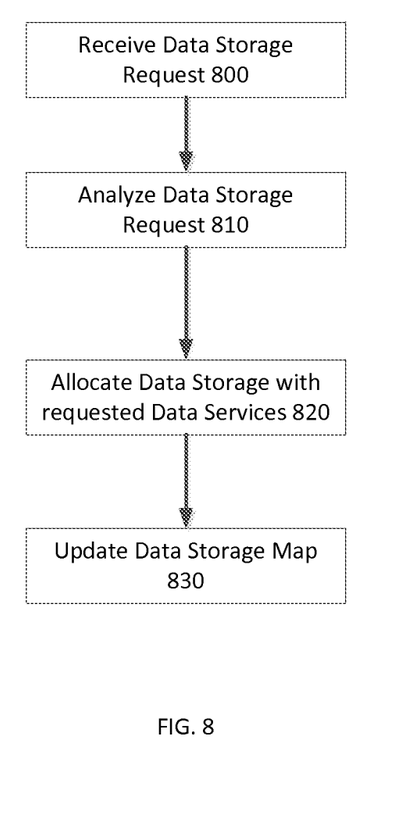
FIG. 8 is a simplified flowchart of a method of managing a data storage stack in a data storage environment, in accordance with an embodiment of the present disclosure.

Refer to the example embodiments of FIGS. 6 and 8. FIG. 8 is a simplified flowchart of a method of managing a data storage stack in a data storage environment, in accordance with an embodiment of the present disclosure. Data storage system 515 receives data storage request (Step 800) from compute node 505 in message 602. Data management module 520 analyzes data storage request (Step 810) and determines what data services and/or Quality of services is requested. Data management module 520 queries services module 525 to determine which portions of data storage stack 575 are required for requested data services and/or quality of services. Data management module 520 sends message 606 to compute node flash storage 530 and message 608 to message flash storage 540 to allocate data storage with requested data services for compute node 505 (Step 820). Data management module 520 updates map 522 (Step 830) and distributes map 522 to compute node 505 using message 604. Compute node 505 uses message 604 to create map 524 which enables compute node 505 to access allocated data storage for compute node 505 from data storage stack 575.

Figure 9:
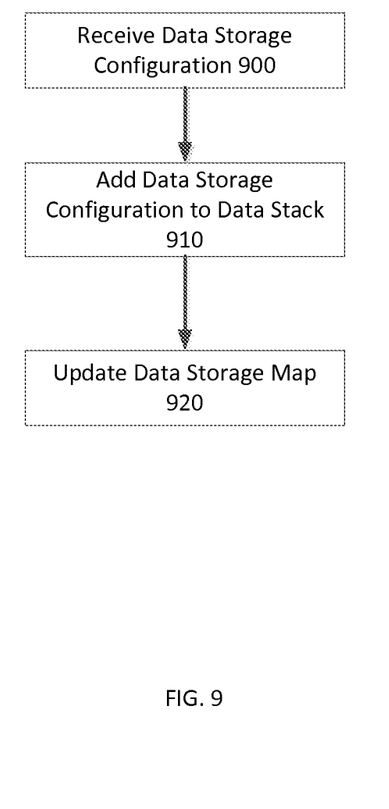
FIG. 9 is a simplified flowchart of a method of configuring persistent data storage within a data storage environment, in accordance with an embodiment of the present disclosure.

Refer to the example embodiments of FIGS. 5 and 9. FIG. 9 is a simplified flowchart of a method of configuring persistent data storage within a data storage environment, in accordance with an embodiment of the present disclosure. Data storage system 515 receives data storage configuration information in message 502 (Step 900) from compute node 505. Data management module 520 sends messages 532 to persistent data storage in data storage environment 500 and adds data storage to data stack 575 (Step 910). Data management module updates map 522 with additional data storage added to data storage stack 575 (Step 920) and distributes map 522 to compute node 505 using message 504. compute node 505 creates map 524 from message 504.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium.

Figure 10:
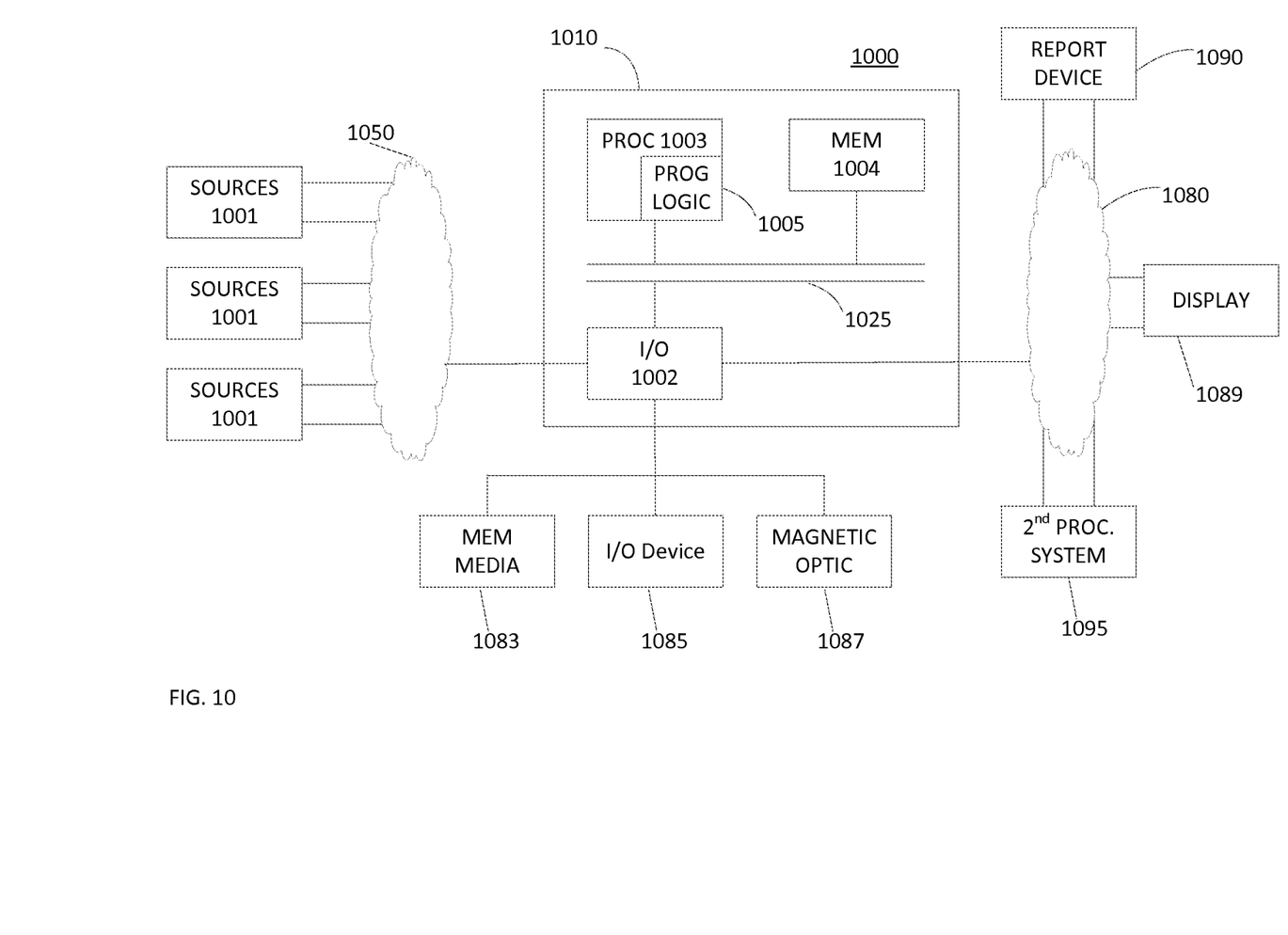
FIG. 10 is an example of an embodiment of an apparatus that may utilize the techniques described herein, in accordance with an embodiment of the present disclosure.

FIG. 10 is a block diagram illustrating an apparatus, such as a computer 1010 in a network 1000, which may utilize the techniques described herein according to an example embodiment of the present invention. The computer 1010 may include one or more I/O ports 1002, a processor 1003, and memory 1004, all of which may be connected by an interconnect 1025, such as a bus. Processor 1003 may include program logic 1005. The I/O port 1002 may provide connectivity to memory media 1083, I/O devices 1085, and drives 1087, such as magnetic or optical drives. When the program code is loaded into memory 704 and executed by the computer 1010, the machine becomes an apparatus for practicing the invention. When implemented on one or more general-purpose processors 1003, the program code combines with such a processor to provide a unique apparatus that operates analogously to specific logic circuits. As such, a general purpose digital machine can be transformed into a special purpose digital machine.

Figure 11:
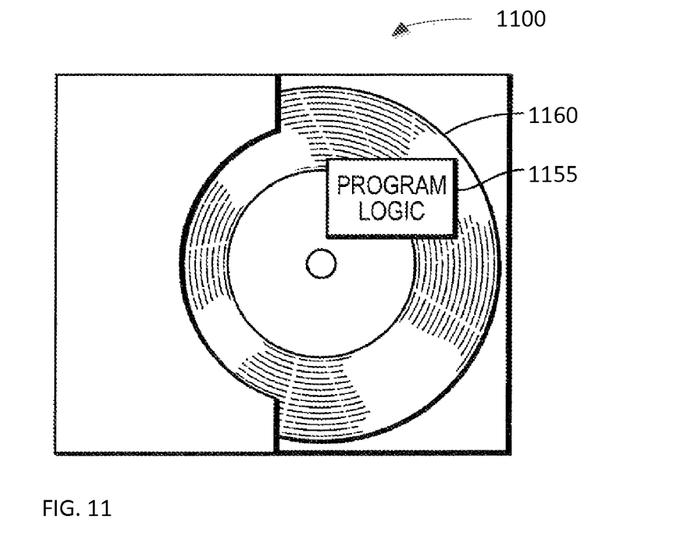
FIG. 11 is an example of a method embodied on a computer readable storage medium that may utilize the techniques described herein, in accordance with an embodiment of the present disclosure.

FIG. 11 is a block diagram illustrating a method embodied on a computer readable storage medium 1160 that may utilize the techniques described herein according to an example embodiment of the present invention. FIG. 11 shows Program Logic 1155 embodied on a computer-readable medium 1160 as shown, and wherein the Logic is encoded in computer-executable code configured for carrying out the methods of this invention and thereby forming a Computer Program Product 1100. Program Logic 1155 may be the same logic 1005 on memory 1004 loaded on processor 1003 in FIG. 10. The program logic may be embodied in software modules, as modules, as hardware modules, or on virtual machines.

The logic for carrying out the method may be embodied as part of the aforementioned system, which is useful for carrying out a method described with reference to embodiments shown in, for example, FIGS. 1-11. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A computer-executable method for managing tiers of data storage in a data storage environment using a data storage system, the computer-executable method comprising:
   initializing a data stack, wherein the data stack represents data storage from the data storage environment using the data storage system;
   wherein the data storage stack is ordered in the data storage environment as compute node storage, hot storage, and cold storage, wherein the compute node storage includes compute node flash storage, hot storage includes flash storages and cold storage includes data storage;
   wherein data redundancy is enabled to be provided using two or more tiers of the data stack;
   updating a map of the data stack, wherein the map includes data services provided by the data stack; and
   distributing the map of the data stack to a compute node in the data storage environment.

2. The computer-executable method of claim 1, wherein initializing comprises:
   receiving configuration information of one or more sources of data storage within the data storage environment;
   consuming a portion of data storage on the one or more sources of data storage; and
   creating the data stack from the consumed portion of data storage.

3. The computer-executable method of claim 2, wherein initializing further comprises analyzing the data stack to determine what data services available from the data stack.

4. The computer-executable method of claim 1, further comprising providing data storage from the data stack to the compute node.

5. The computer-executable method of claim 1, further comprising providing a data service from the data stack to the compute node.

6. A system, comprising:
   a data storage system in a data storage environment; and
   computer executable program logic encoded in memory of one or more computers in communication with the data storage system to enable management of tiers of data storage in a data storage environment using a data storage system, wherein the computer-executable program logic is configured for the execution of:
- initializing a data stack, wherein the data stack represents data storage from the data storage environment using the data storage system;
- wherein the data storage stack is ordered in the data storage environment as compute node storage, hot storage, and cold storage, wherein the compute node storage includes compute node flash storage, hot storage includes flash storages and cold storage includes data storage;
- wherein data redundancy is enabled to be provided using two or more tiers of the data stack;
- updating a map of the data stack, wherein the map includes data services provided by the data stack; and
- distributing the map of the data stack to a compute node in the data storage environment.

7. The system of claim 6, wherein initializing comprises:
- receiving configuration information of one or more sources of data storage within the data storage environment;
- consuming a portion of data storage on the one or more sources of data storage; and
  - creating the data stack from the consumed portion of data storage.

8. The system of claim 7, wherein initializing further comprises analyzing the data stack to determine what data services available from the data stack.

9. The system of claim 6, wherein the computer-executable program logic is further configured for the execution of providing data storage from the data stack to the compute node.

10. The system of claim 6, wherein the computer-executable program logic is further configured for the execution of providing a data service from the data stack to the compute node.

11. A computer program product for managing tiers of data storage in a data storage environment using a data storage system, the computer program product comprising:
- a non-transitory computer readable medium encoded with computer-executable program code for using read signatures in replication, the code configured to enable the execution of:
  - initializing a data stack, wherein the data stack represents data storage from the data storage environment using the data storage system;
  - wherein the data storage stack is ordered in the data storage environment as compute node storage, hot storage, and cold storage, wherein the compute node storage includes compute node flash storage, hot storage includes flash storages and cold storage includes data storage;
  - wherein data redundancy is enabled to be provided using two or more tiers of the data stack;
  - updating a map of the data stack, wherein the map includes data services provided by the data stack; and
  - distributing the map of the data stack to a compute node.

12. The computer program product of claim 11, wherein initializing comprises:
- receiving configuration information of one or more sources of data storage within the data storage environment;
- consuming a portion of data storage on the one or more sources of data storage; and
- creating the data stack from the consumed portion of data storage.

13. The computer program product of claim 12, wherein initializing further comprises analyzing the data stack to determine what data services available from the data stack.

14. The computer program product of claim 11, wherein the code is further configured to enable the execution of providing data storage from the data stack to a compute node.

15. The computer program product of claim 11, wherein the code is further configured to enable the execution of providing a data service from the data stack to a compute node.

* * * * *

UNITED STATES PATENT AND TRADEMARK OFFICE
CERTIFICATE OF CORRECTION

PATENT NO. : 10,409,920 B1
APPLICATION NO. : 14/502531
DATED : September 10, 2019
INVENTOR(S) : John S. Harwood et al.

Page 1 of 1

It is certified that error appears in the above-identified patent and that said Letters Patent is hereby corrected as shown below:

On the Title Page

In the Abstract:
In the beginning of the paragraph, please replace "A Computer-executable method," with --A computer-executable method,--

After "using a data storage system," please replace "the Computer-executable method," with --the computer-executable method,--

In the Specification

Column 1, Line 48, please replace "Computer-executable method," with --computer-executable method,--

Column 1, Lines 50-51, please replace "Computer-executable method," with --computer-executable method,--

Column 7, Line 53, after the sentence ending "such as magnetic or optical drives," please insert --The computer 1010 is coupled to a plurality of sources 1001 via a network 1050 and the I/O port 1002. The computer 1010 is further coupled to a display 1089, a report device 1090, and a second processing system 1095 via a network 1080 and the I/O port 1002.--

In the Claims

Column 8, Claim 1, Line 38 please delete "flash storages" and insert --flash storage--

Column 9, Claim 6, Line 12 please delete "flash storages" and insert --flash storage--

Column 10, Claim 11, Line 12 please delete "flash storages" and insert --flash storage--

Signed and Sealed this
Twenty-sixth Day of November, 2019

Andrei Iancu
*Director of the United States Patent and Trademark Office*